United States Patent [19]
Dieterich

[11] 4,237,250
[45] Dec. 2, 1980

[54] POLYURETHANES CONTAINING ARYL SULFONIC ACID ALKYL ESTER GROUPS

[75] Inventor: Dieter Dieterich, Leverkusen, Fed. Rep. of Germany

[73] Assignee: Bayer Aktiengesellschaft, Leverkusen, Fed. Rep. of Germany

[21] Appl. No.: 929,616

[22] Filed: Jul. 31, 1978

[30] Foreign Application Priority Data

Aug. 3, 1977 [DE] Fed. Rep. of Germany ....... 2735047

[51] Int. Cl.³ .............................................. C08L 63/00
[52] U.S. Cl. .................................. 525/440; 525/403; 525/407; 525/454; 528/73
[58] Field of Search ............ 260/83 OP, 833; 528/73; 325/403, 407, 440, 454

[56] References Cited

U.S. PATENT DOCUMENTS

| | | | |
|---|---|---|---|
| 3,148,167 | 9/1964 | Keplinger | 260/83 OP |
| 3,238,273 | 3/1966 | Hampson | 260/83 OP |
| 3,636,133 | 1/1972 | Hawkins | 260/83 OP |
| 3,959,329 | 5/1976 | Dieterich et al. | 260/29.2 TN |
| 4,036,906 | 7/1977 | Finelli | 260/83 OP |
| 4,038,232 | 7/1977 | Bosso | 260/83 OP |
| 4,174,434 | 11/1979 | Dieterich | 528/69 |

FOREIGN PATENT DOCUMENTS 2640103 3/1978 Fed. Rep. of Germany .

Primary Examiner—Paul Lieberman
Attorney, Agent, or Firm—Gene Harsh; Joseph C. Gil; R. Brent Olson

[57] ABSTRACT

The instant invention is directed to polyurethanes containing sulfonic acid ester groups wherein arylsulfonic acid alkyl ester groups are attached to aromatic nuclei as chain members and to their method of preparation. The process is characterized by reacting at from 0° to 190° C.

(A) aromatic isocyanatosulfonic acids; with
(B) oxiranes and/or oxetanes wherein the equivalent ratio of NCO groups to $SO_3H$ groups is from 0.1:1 to 1.99:1 and the equivalent ratio of epoxide (and/or oxetane) groups to $SO_3H$ groups is from 0.2:1 to 5:1. The invention is also directed to the product by process.

16 Claims, No Drawings

POLYURETHANES CONTAINING ARYL SULFONIC ACID ALKYL ESTER GROUPS

BACKGROUND OF THE INVENTION

Polyurethane-polysulfonic acid esters which have a linear structure are known. They may be prepared, for example, by adding a sulfonic acid ester diol to the reaction mixture used for synthesizing a polyurethane. In German Pat. Nos. 1,156,977 and 1,184,946 it is proposed to react polyether-diols with diisocyanates and glycerol-monotosylate to produce polyurethane-polysulfonic acid esters which are then used for a quaternization reaction with mono-functional or di-functional tertiary amines to produce polyurethane-ionomers. In these products, side-chain aromatic sulfonic acid ester units are attached to an aliphatic chain segment. In the quaternization reaction, the aromatic sulfonic acid group is split off as an anion.

From U.S. Pat. No. 3,826,769, it is known to prepare polyurethanes on the basis of polyisocyanate-sulfonic acids, both polyurethane-polysulfonic acids and salts thereof being obtained. These polyurethanes are prepared either by sulfonating monomeric diisocyanates, such as tolylene diisocyanate, with sulfur trioxide and then using the resulting sulfonated diisocyanate as part of the isocyanate component for synthesizing a polyurethane or by first preparing a prepolymer having isocyanate end groups in the conventional manner and then sulfonating this with sulfuric acid by a reaction which is accompanied by partial chain-lengthening. The reaction products which contain sulfonic acid groups are then neutralized with a base and mixed with water, whereby aqueous polyurethane-ionomer dispersions are obtained. Polyurethanes which are modified with sulfonic acid groups or sulfonate groups in this way are frequently highly hydrophilic. For this reason, the sulfonic acid group content is generally kept as low as possible. When preparing dispersions, for example, one would only introduce the minimum quantity of sulfonate groups necessary to disperse the polyurethanes adequately and produce a stable dispersion. A higher sulfonic acid group content would impair the water-resistance of coatings obtained from the dispersions. For this reason, it is recommended to use only from 0.1 to 2% of sulfonating agent, based on the quantity of polyurethane, for preparing dispersions.

The preparation of polyurethanes and polyureas having a high filler content using polyisocyanate-sulfonic acids has also been disclosed in German Offenlegungsschrift No. 2,359,611. In this case, the sulfonic acid groups give rise to particular interactions between the organic binder and the fillers used, whereby high bonding forces are produced even when only very small quantities of binder are used. Where inorganic fillers are used, neutralization of the sulfonic acid groups generally takes place directly on the surface of the particles. In this process, again, only a proportion of the polyisocyanates used are sulfonated in order not to adversely affect the water-resistance and moisture-resistance of the composite materials obtained.

The exclusive use of polyisocyanates in the form of the sulfonic acids thereof would be of particular interest both from a technical point of view and from the point of view of toxicology and industrial hygiene. The sulfonic acids of aromatic isocyanates are pulverulent substances which have no vapor pressure and are therefore very safe to work with. Moreover, degradation of these isocyanates and of the polyaddition products produced from them gives rise to water-soluble diamino sulfonic acids which appear to be non-toxic. However, when isocyanatosulfonic acids are used alone for the synthesis of polyaddition products, the products obtained are highly hydrophilic and in many cases even water-soluble.

There is therefore a demand for a process which enables isocyanatosulfonic acids to be used as the sole isocyanate component and at the same time enables hydrophobic, water-resistant polyurethanes to be obtained. A solution to this problem is an object of the present invention.

DESCRIPTION OF THE INVENTION

It has surprisingly been found that when aromatic polyisocyanatosulfonic acids are reacted with oxiranes or oxetanes, the desired hydrophobic polyurethanes are obtained and sulfonic acid ester groups are formed at the same time. The new polymers obtained according to the present invention are therefore polyurethane-polysulfonic acid esters which are characterized by having aryl sulfonic acid ester-alkyl ester groups attached to aromatic nuclei as chain members.

The process of the present invention is advantageous from several points of view:

(1) It enables the chemistry of isocyanates to be advantageously combined with the chemistry of epoxides or oxetanes so that the reaction between the isocyanate component and the epoxide or oxetane may take place at room temperature and in the absence of catalysts;

(2) A new principle of reaction is proposed, according to which the isocyanate component may easily be chain-lengthened or cross-linked even with a mono-epoxide or oxetane, but also with di-epoxides or poly-epoxides. The reaction which takes place is presumably to be explained on the basis that the sulfonic acid group is added to the heterocyclic group in a first reaction step and the OH group thereby formed is converted into a urethane by reaction with an isocyanate group in the second step;

(3) The process enables polyurethanes to be synthesized with the sole use of polyisocyanatosulfonic acids as the isocyanate component, whereby hydrophobic, water-resistant products are obtained;

(4) The process may be carried out with the conventional components used for the preparation of urethanes and may thus be widely varied in many directions so that both rigid duromers and elastomers in all ranges of hardness may be produced either as homogeneous products or as foam products;

(5) The products resulting from degradation of the polyurethane-polysulfonic acid esters according to the present invention are toxicologically harmless.

The present invention thus relates to polyurethanes containing sulfonic acid ester groups, characterized by aryl sulfonic acid alkyl ester groups attached to aromatic nuclei as chain members. These products preferably contain recurrent units corresponding to the following general formula:

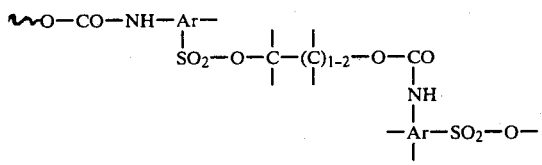

wherein Ar represents a residue of an aromatic isocyanate; and in particular recurrent units corresponding to the following general formula:

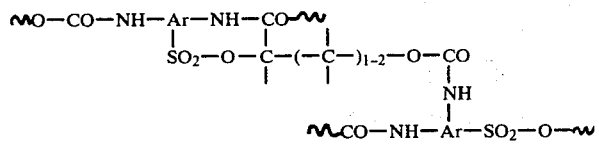

The new polyurethanes preferably have a molecular weight above 12,000.

The present invention also relates to a process for the preparation of aryl sulfonic acid alkyl ester groups, characterized in that aromatic isocyanatosulfonic acids are reacted with oxiranes and/or oxetanes at temperatures of from 0° to 190° C., using an equivalent ratio of isocyanate groups to $SO_3H$ groups of from 0.1:1 to 1.99:1 (preferably from 0.2:1 to 1:1) and an equivalent ratio of epoxide or oxetane groups to $SO_3H$ groups of from 0.2:1 to 5:1 (preferably from 0.5:1 to 2:1). It is particularly preferred to include polyether- and/or polyester-polyols (of the conventional type used in polyurethane chemistry) in the process or to use aromatic isocyanatosulfonic acids of the type which contain polyether and/or polyester units.

The preparation of three-dimensionally cross-linked polyurethane-polysulfonic acid esters on the basis of aromatic polyisocyanatosulfonic acid is particularly preferred.

The sulfonation products of any of the known aromatic diisocyanates or polyisocyanates may be used as isocyanates of the invention. The following are examples of such isocyanates: 4,4'-stilbenediisocyanate; 4,4'-dibenzyldiisocyanate; 3,3'- and 2,2'-dimethyl-4,4'-diisocyanatodiphenylmethane; 2,5,2',5'-tetramethyl-4,4'-diisocyanatodiphenylmethane; 3,3'-dimethoxy-4,4'-diisocyanato-diphenylmethane, 3,3'-dichloro-4,4'-diisocyanato-diphenylmethane; 4,4'-diisocyanato-dimethylmethane; 4,4'-diisocyanato-diphenylcyclohexylmethane; 4,4'-diisocyanato-benzophenone; 4,4'-diisocyanato-diphenylsulfone; 4,4'-diisocyanato-diphenylether; 4,4'-diisocyanato-3,3'-dibromo-diphenylmethane; 4,4'-diisocyanato-3,3'-diethyl-diphenylmethane; 4,4'-diisocyanato-diphenylethylene-(1,2); 4,4'-diisocyanato-diphenyl-sulphide; 1,3- and 1,4-phenylenediisocyanate; 2,4- and 2,6-tolylene-diisocyanate and mixtures of these isomers; diphenylmethane-2,4'- and/or -4,4'-diisocyanate; naphthylene-1,5-diisocyanate; triphenylmethane-4,4',4''-triisocyanate; polyphenyl-polymethylene polyisocyanates which may be obtained by aniline/formaldehyde condensation followed by phosgenation, e.g. those described in British Pat. Nos. 874,430 and 848,671; polyisocyanates containing carbodiimide groups as described in German Pat. No. 1,092,007; the diisocyanates described in U.S. Pat. No. 3,492,330; polyisocyanates containing allophanate groups, e.g. those described in British Pat. No. 994,890, Belgian Pat. No. 761,626 and published Dutch Patent Application No. 7,102,524; polyisocyanates containing isocyanurate groups, e.g. those described in German Pat. Nos. 1,022,789; 1,222,067 and 1,027,394 and in German Offenlegungsschriften Nos. 1,929,034 and 2,004,048; polyisocyanates containing acylated urea groups as described in German Pat. No. 1,230,778 and polyisocyanates containing biuret groups, e.g. those described in Pat. No. 1,101,394, British Pat. No. 889,050 and French Pat. No. 7,017,514. The distillation residues obtained from the commercial production of isocyanates and still containing isocyanate groups may also be used, optionally dissolved in one or more of the above-mentioned polyisocyanates. Mixtures of the above-mentioned polyisocyanates may also be used.

Phosgenation products of condensates of aniline and aldehydes or ketones, such as acetaldehyde, propionaldehyde, butyraldehyde, acetone, methylethyl ketone, etc., are also suitable, as are also the phosgenation products of condensates of anilines which are alkyl-substituted on the nucleus, in particular the condensates of toluidines with aldehydes or ketones, such as formaldehyde, acetaldehyde, butyraldehyde, acetone, methylethyl ketone, and the like.

Reaction products of the above-mentioned aromatic polyisocyanate mixtures with from 0.2 to 50 mol percent of polyols are also suitable, provided the viscosity of the resulting reaction products does not exceed 50,000 cP at 25° C. and the isocyanate content of the reaction products is at least 6%, by weight. Suitable polyols for modifying the starting materials include, in particular, polyether- and/or polyester-polyols having molecular weights of from 200 to 6,000, preferably from 300 to 4,000, and low molecular weight polyols having molecular weights of from 62 to 200 commonly used in polyurethane chemistry. Examples of such low molecular weight polyols include ethylene glycol, propylene glycol, glycerol, trimethylolpropane, 1,4,6-hexane triol, and the like.

It is preferred to use completely sulfonated isocyanates which contain one or two sulfonic acid groups in the molecule. It is particularly preferred to use the dimeric forms of mono- and di- sulfonic acids of 4,4'-diisocyanato-diphenylmethane, 2,4'-diisocyanato-diphenylmethane, or 2,4-diisocyanatotoluene and 2,6-diisocyanatotoluene and the isomeric mixtures thereof.

It is, of course, also possible to use only partially sulfonated polyisocyanates, particularly partially sulfonated liquid mixtures of polyisocyanates, such as those described in German Offenlegungsschriften Nos. 2,227,111; 2,359,614 and 2,359,615. Partially or completely sulfonated phosgenation products of aniline-formaldehyde condensates are particularly preferred.

The sulfonation products of aromatic monoisocyanates are also suitable, e.g. those of phenyl isocyanate, p-tolyl isocyanate, p-chlorophenyl isocyanate, p-nitrophenyl isocyanate, p-methoxyphenyl isocyanate, m-chlorophenyl isocyanate, m-chloromethylphenyl isocyanate and p-chloromethylphenyl isocyanate.

Since, according to the present invention, both the isocyanate group and the sulfonic acid group react, these monoisocyanatosulfonic acids are to be regarded as di-functional or poly-functional compounds. Sulfonation of the isocyanates is carried out in known manner, preferably using sulfur trioxide, oleum or sulfuric acid. It may be carried out in a separate reaction step. The sulfonic acid isocyanates may then be isolated from the sulfonation mixture, optionally dried, and then introduced into the process according to the present invention in this form. However, sulfonation may equally well be carried out in situ. This has the advantage that the isocyanatosulfonic acids, which are sensitive to moisture, need not be isolated.

Sulfonation in situ is particularly preferred when sulfonic acids of isocyanate prepolymers are used.

Sulfonation may be carried out in known manner using sulfuric acid, oleum or sulfur trioxide or with organic compounds in which sulfur trioxide is bound additively, the reaction being carried out in the absence of water. The sulfur trioxide may be used in the form of a liquid or solution or in a gaseous form, e.g. diluted with nitrogen. Suitable solvents include, for example, tetrahydrofuran, aliphatic ethers, dioxane, dimethyl formamide, dichloro-ethane, chlorobenzene, tetrachloro-ethane, methylene chloride, chloroform and sulfur dioxide. Particularly suitable solvents for the sulfonation component are those which may be left in the reaction mixture or in the finished product as plasticizers or as blowing agents, e.g. fluorochlorinated hydrocarbons, chloroethane, methylene chloride, triethyl phosphate, tris-chloroethyl phosphate, tris-dibromopropyl phosphate (German Offenlegungsschrift No. 2,650,172).

Pulverulent isocyanatosulfonic acids are frequently used in the form of moist powders, pastes or suspensions prepared with the aid of inert dispersing agents (see, e.g. German Offenlegungsschrift No. 2,640,103 or U.S. Pat. No. 4,143,062). When sulfonation is carried out in situ, care should be taken to ensure that the sulfonation reaction has terminated before the epoxide is added.

In addition to the isocyanatosulfonic acids, conventional polyisocyanates of polyurethane chemistry (up to 50%, by weight, thereof, based on the isocyanate component) may also be used. Examples are the polyisocyanates mentioned above as starting materials for sulfonation, as well as aliphatic polyisocyanates. Examples of these are ethylenediisocyanate, tetramethylene-1,4-diisocyanate, hexamethylene-1,6-diisocyanate, dodecane-1,12-diisocyanate, cyclobutane-1,3-diisocyanate, and cyclohexan-1,3- and 1,4-diisocyanate and mixtures of these isomers. Further examples are 1-isocyanato-3,3,5-trimethyl-5-isocyanatomethyl-cyclohexane (German Auslegeschrift No. 1,202,785 and U.S. Pat. No. 3,401,190), hexahydrotolylene-2,4- and -2,6-diisocyanate and mixtures of these isomers. Hexahydrophenylene-1,3- and/or 1,4-diisocyanate, perhydrodiphenylmethane-2,4'- and/or -4,4'-diisocyanate and derivatives thereof, e.g. urethanes and biurets of the type mentioned above in the list of aromatic polyisocyanates, may be used.

The starting components of the present invention may also include compounds having molecular weights generally of from 400 to 10,000 which have at least two isocyanate-reactive hydrogen atoms. These compounds may contain amino groups, thiol groups or carboxyl groups, but are preferably polyhydroxyl compounds. Particularly preferred are compounds having from 2 to 8 hydroxyl groups and molecular weights of from 800 to 10,000, preferably from 1000 to 6000. Examples of these compounds are polyesters, polyethers, polythioethers, polyacetals, polycarbonates and polyester amides having at least two, generally from 2 to 8, but preferably from 2 to 4, hydroxyl groups, of the type known for the production of both homogeneous and cellular polyurethanes.

Suitable polyesters containing hydroxyl groups include, e.g. reaction products of polyhydric, preferably dihydric, alcohols, optionally with the addition of trihydric alcohols, and polybasic, preferably dibasic, carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or may be unsaturated. The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrachlorophthalic acid anhydride, glutaric acid anhydride, maleic acid, maleic acid anhydride and fumaric acid. Dimeric and trimeric fatty acids, such as oleic acid, optionally mixed with monomeric fatty acids, dimethyl terephthalate and terephthalic acid-bis-glycol esters may also be used. The following are examples of suitable polyhydric alcohols: ethylene glycol, propylene glycol-(1,2) and -(1,3), butylene glycol-(1,4) and -(2,3), hexanediol-(1,6), octanediol-(1,8). neopentylglycol, cyclohexanedimethanol (1,4-bis-hydroxymethylcyclohexane), 2-methyl-1,3-propanediol, glycerol, trimethylolpropane, hexanetriol-(1,2,6), butanetriol-(1,2,4), trimethylolethane, pentaerythritol, quinitol, mannitol, sorbitol, methylglycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones, such as $\epsilon$-caprolactone, or hydroxycarboxylic acids, such as $\omega$-hydroxycaproic acid, may also be used.

The polyesters of the invention which have at least two hydroxyl groups are also known and are prepared, for example, by polymerization of epoxides, such as ethylene oxide, propylene oxide, butylene oxide, tetrahydrofuran, styrene oxide or epichlorohydrin. They may be polymerized on their own, e.g. in the presence of $BF_3$, or by addition of these epoxides, optionally as mixtures or successively, to starting components having reactive hydrogen atoms, such as alcohols or amines, e.g. water, ethylene glycol, propylene glycol-(1,3) or -(1,2), trimethylolpropane, 4,4'-dihydroxy-diphenylpropane, aniline, ammonia, ethanolamine or ethylene diamine. Sucrose polyethers may also be used according to the present invention, e.g. those described in German Auslegeschriften Nos. 1,176,358 and 1,064,938. It is in many cases preferred to use polyethers which contain predominantly primary OH groups (up to 90%, by weight, based on all the OH groups present in the polyether). Polyethers modified with vinyl polymers, e.g. the compounds obtained by polymerization of styrene or acrylonitrile in the presence of polyethers (U.S. Pat. Nos. 3,383,351; 3,304,273; 3,523,093 and 3,110,695 and German Pat. No. 1,152,536) are also suitable, as well as polybutadienes which have OH groups.

Preferred polythioethers are the condensation products obtained by reacting thiodiglycol on its own and/or with other glycols, dicarboxylic acids, formaldehyde, amino-carboxylic acids or amino alcohols. The products obtained are polythio mixed ethers, polythio ether esters or polythio ether ester amides, depending on the co-components.

Suitable polyacetals include, for example, the compounds which may be prepared from the reaction of glycols, such as diethylene glycol, triethylene glycol, 4,4'-dioxethoxydiphenyl dimethylmethane and hexanediol, with formaldehyde. Suitable polyacetals for the purposes of the present invention may also be prepared by the polymerization of cyclic acetals.

The polycarbonates containing hydroxyl groups used may be of the type which may be prepared by the reaction of diols, such as propanediol-(1,3), butanediol-(1,4) and/or hexanediol-(1,6), diethylene glycol, triethylene glycol or tetraethylene glycol, with diarylcarbonates, e.g. diphenylcarbonate or with phosgene.

Suitable polyester amides and polyamides include, for example, the predominantly linear condensates prepared from polybasic saturated and unsaturated carboxylic acids or the anhydrides thereof and polyfunctional saturated and unsaturated amino alcohols, diamines, polyamines and mixtures thereof.

Polyhydroxyl compounds already containing urethane or urea groups and modified or unmodified natural polyols, such as castor oil, carbohydrates or starch may also be used. Addition products of alkylene oxides and phenol/formaldehyde resins or the alkylene oxides and urea/formaldehyde resins are also suitable for the purposes of the present invention.

There may also be used polyhydroxyl compounds in which high molecular weight polyadducts and polycondensates are contained in a finely dispersed or dissolved form. Such modified polyhydroxyl compounds are obtained when polyaddition reactions (e.g. reactions between polyisocyanates and aminofunctional compounds) or polycondensation reactions (e.g. between formaldehyde and phenols and/or amines) are carried out in situ in the above-mentioned hydroxyl group-containing compounds. Processes of this type have been described in German Auslegeschriften Nos. 1,168,075 and 1,260,142 and in German Offenlegungsschriften Nos. 3,324,134; 2,423,984; 2,512,385; 2,513,815; 2,550,796; 2,550,797; 2,550,833 and 2,550,862. Alternatively, these modified polyhydroxyl compounds may be obtained according to U.S. Pat. No. 3,869,413 or German Offenlegungsschrift No. 2,550,860 by mixing a previously prepared polymer dispersion with a polyhydroxyl compound and then removing the water from the mixture.

Representatives of these compounds which may be used in the present invention have been described, for example, in High Polymers, Vol. XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Höchtlen, Carl-Hanser-Verlag, Munich, 1966, pages 45 to 71.

Mixtures of the above-mentioned compounds such as mixtures of polyethers and polyesters which contain at least two isocyanate-reactive hydrogen atoms and have a molecular weight of from 400 to 10,000 may also be used.

The starting components used in the present invention may also include compounds having molecular weights of from 32 to 400 which have at least two hydrogen atoms capable of reacting with isocyanates. These compounds are also understood to be compounds containing hydroxyl groups and/or amino groups and/or thiol groups and/or carboxyl groups, preferably hydroxyl groups and/or amino groups. They serve as chain-lengthening agents or cross-linking agents. They generally have from 2 to 8 isocyanate-reactive hydrogen atoms, preferably 2 or 3 such hydrogen atoms. The following are examples of such compounds: ethylene glycol, propylene glycol-(1,2) and -(1,3), butylene glycol-(1,4) and -(2,3), pentanediol-(1,5), hexanediol-(1,6), octanediol-(1,8), neopentyl glycol, 1,4-bis-hydroxymethyl-cyclohexane, 2-methyl-1,3-propanediol, glycerol, trimethylol propane, hexanetriol-(1,2,6), trimethylolethane, pentaerythritol, quinitol, mannitol, sorbitol, diethylene glycol, triethylene glycol, tetraethylene glycol, polyethylene glycols having a molecular weight of up to 400, dipropylene glycol, polypropylene glycols having a molecular weight of up to 400, dibutylene glycol, polybutylene glycols having a molecular weight of up to 400, 4,4'-dihydroxydiphenyl propane, dihydroxymethyl-hydroquinone, ethanolamine, diethanolamine, triethanolamine, 3-aminopropanol, ethylene diamine, 1,3-diaminopropane, 1-mercapto-3-aminopropane, 4-hydroxyphthalic acid, 4-aminophthalic acid, succinic acid, adipic acid, hydrazine, N,N-dimethylhydrazine and 4,4'-diaminodiphenylmethane.

In this case again there may be used mixtures of various compounds having a molecular weight of from 32 to 400 and containing at least two isocyanate-reactive hydrogen atoms.

The following oxiranes and oxetanes may be used in the present invention; aliphatic, cycloaliphatic, aromatic and heterocyclic mono-, di- and poly-epoxides and epoxides which contain hydroxyl groups. The following are examples of monoepoxides: ethylene oxide; propylene oxide; butene-1,2-oxide, butene-2,3-oxide; 1,4-dichlorobutene-2,3-oxide; styrene oxide; 1,1,1-trichloropropene-2,3-oxide; 1,1,1-trichlorobutene-3,4-oxide; 1,4-dibromobutene-2,3-oxide; epichlorohydrin; epibromohydrin, glycidyl; glycerol-monoglycidyl ether; isobutene oxide; p-glycidyl-styrene; N-glycidyl-carbazole; cyanoethylglycidyl-ether; trichloroethylglycidyl-ether; chloroethylglycidyl-ether; bromoethylglycidyl-ether; vinyl oxirane; 3,4-dichlorobutene-1,2-oxide; 2-(1-chlorovinyl)-oxirane; 2-chloro-2-vinyl-oxirane; 2,3-epipropylphosphonic acid diethyl ester; 3,4-bis-hydroxybutene-1,2-oxide; 2-methyl-2-vinyloxirane and 2-(1-methylvinyl)-oxirane.

Products of epoxydation of natural fats and oils, such as soya bean oil, olive oil, linseed oil and train oil, as well as of synthetic di- or poly-esters which contain unsaturated fatty acids, such as oleic acid, linoleic acid, linolenic acid, ricinoleic acid, or erucic acid, are also suitable.

Esters of glycidyl with monocarboxylic acids are also suitable, e.g. glycidyl-acetate, glycidyl-chloroacetate, glycidyl-dichloroacetate, glycidyl-trichloroacetate, glycidyl-bromoacetate, glycidyl-acrylate, glycidyl-methacrylate, glycidyl caproate, glycidyl-octoate, glycidyl-laurate, glycidyl-oleate and glycidyl-stearate. Ethers of glycidyl are also suitable, e.g. with phenol and substituted phenols, in particular halogenated phenols.

The reaction products of hydroxy-oxiranes are also very suitable, particularly of glycidyl with aliphatic, cycloaliphatic or aromatic mono- and poly-isocyanates.

Di- and poly-epoxides may also be used in order to increase the density of cross-linking, either alone or in combination with the monoepoxides indicated above.

Di- and poly-functional epoxides of this type include, for example, the epoxidation products of aliphatic and cycloaliphatic diolefins. Examples include diepoxybutane, diepoxyhexane, vinyl-cyclohexene dioxide, dicyl-copentadiene dioxide, limonene dioxide, dicyclopentadiene dioxide, ethylene glycol-bis-(3,4-epoxytetrahydrodicyclopentadien-8-yl)-ether, (3,4-epoxytetrahydrodicyclopentadien-8-yl)-glycidyl ether, epoxidized polybutadienes or copolymers of butadiene with ethylenically unsaturated compounds, such as styrene or vinyl acetate, compounds having two epoxycyclohexyl groups, such as diethylene glycol-bis-(3,3-epoxycyclohexane-carboxylate), bis-3,4-(epoxycyclohexylmethyl)-succinate, 3,4-epoxy-6-methylcyclohexylmethyl-3',4'-epoxy-6'-methyl-cyclohexane-carboxylate and 3,4-epoxy hexahydrobenzal-3',4'-epoxycyclohexane-1',1'-dimethanol.

Substances which may be used include polyglycidyl esters, such as those which are obtained by the reaction of a dicarboxylic acid or of cyanuric acid with epichlorohydrin or dichlorohydrin in the presence of an alkali. Polyesters of this type may be derived from aliphatic dicarboxylic acids, such as succinic acid or adipic acid, or particularly from aromatic dicarboxylic acids, such as phthalic acid or terephthalic acid. Diglycidyl adipate, diglycidyl phthalate and triglycidylisocyanurate may be mentioned in this connection.

Polyglycidyl ethers, such as those obtained by etherifying a dihydric or polyhydric alcohol, a diphenol or polyphenol with epichlorohydrin or dichlorohydrin in the presence of an alkali are preferably used. These compounds may be derived from glycols, such as ethylene glycol, diethylene glycol, triethylene glycol, 1,3-propylene glycol, 1,4-butanediol, 1,5-pentanediol, 1,6-hexanediol, 2,4,6-hexanetriol and glycerol, and particularly diphenols or polyphenols, such as resorcinol, pyrocatechol, hydroquinone, phenolphthalein, phenol-formaldehyde condensation products, such as "Novolaks", 1,4-di-hydroxy-naphthalene, dihydroxy-1,5-naphthalene, bis-(hydroxy-4-phenyl)-methane, tetrahydroxyphenyl-1,1,2,2-ethane, bis-(hydroxy-4-phenyl)-methylphenylmethane, the bis-(hydroxy-4-phenyl)-tolylmethanes, dihydroxy-4,4'-diphenyl-bis-(hydroxy-4-phenyl)-sulfone and particularly bis-(hydroxy-4-phenyl)-2,2-propane or the condensation products of a phenol with an aldehyde or a ketone. The lastmentioned condensation products are epoxy resins having two or more epoxy groups and possibly also three hydroxyl groups. Particularly suitable among them are the epoxy resins prepared from polyphenols, which are marketed under the trade name "NOVOLAK" resins, which are polycondensation products of a phenol with formol. The epoxy resins obtained are represented by the following formula:

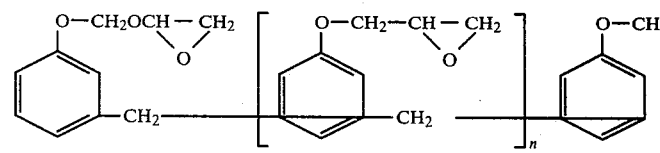

Also suitable are the polyglycidyl ethers of diphenols obtained by esterification of 2 mols of the sodium salt of an aromatic hydroxycarboxylic acid with one mol or a dihalogen alkane or dihalogen dialkyl ether (see British Pat. No. 1,017,612) or of polyphenols, obtained by the condensation of phenols with long chain halogenated paraffins which contain at least two halogen atoms (see British Pat. No. 1,024,288). The following are also mentioned as examples: polyepoxide compounds based on aromatic amines and epichlorohydrin, e.g. N-di-(2,3-epoxypropyl)-aniline, N,N'-dimethyl-N,N'-diepoxypropyl-4,4'-diamino-diphenylmethane-N,N'-tetraepoxypropyl-4,4'-diaminodiphenylmethane and N-diepoxypropyl-4-aminophenyl glycidyl ether (see British Pat. Nos. 772,830 and 816,923). The following may also be used: glycidyl esters of polybasic aromatic and cycloaliphatic carboxylic acids. Examples are phthalic acid diglycidyl having more than 5.5 epoxide equivalents per kg and glycidyl esters of reaction products of one mol of an aromatic or cycloaliphatic dicarboxylic acid anhydride and ½ mol of a diol or 1/n mol of a polyol having n hydroxyl groups, or hexahydrophthalic acid esters, which may be substituted with methyl groups.

Glycidyl compounds based on inorganic acids, e.g. triglycidyl phosphate, glycidyl ethers of hydroxyphenyl phosphoric acid esters, diglycidyl carbonate, tetraglycidyl titanate and epoxy alkyl phosphine oxide should also be mentioned (German Auslegeschrift No. 1,943,712).

Cycloaliphatic epoxide compounds are also suitable, e.g. compounds corresponding to the following formulae:

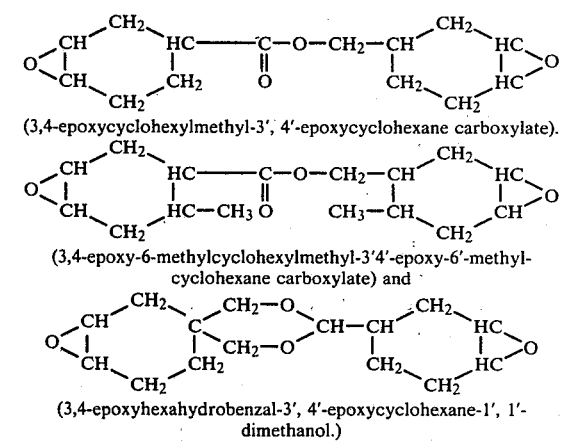

Particularly suitable heterocyclic epoxide compounds are the triglycidyl isocyanurates corresponding to the following formula:

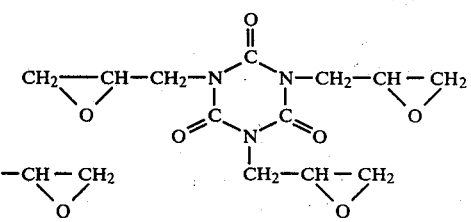

n = 0–10 and N,N'-diglycidyl-dimethylhydantoin corresponding to the following formula:

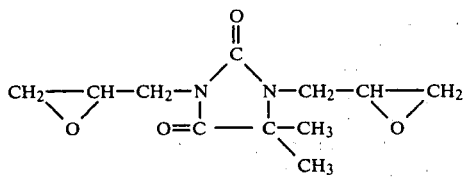

Mixtures of such cycloaliphatic and/or heterocyclic epoxide compounds may also be used.

Other preferred compounds include the polyglycidyl ethers of bis-(p-hydroxyphenyl)-dimethyl methane (bisphenol A), which may be represented by the following average formula:

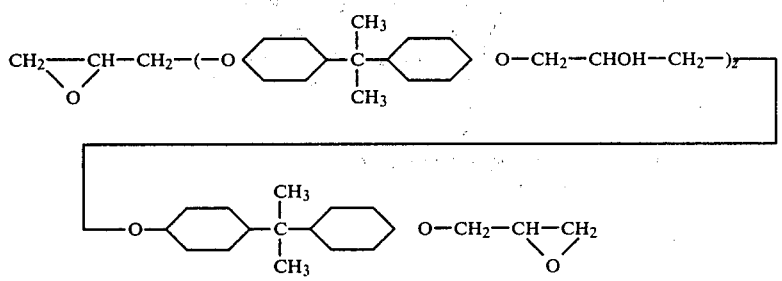

wherein z represents a small whole number or fraction of from 0 to 2.

The following are also examples of suitable diepoxides: glycerol-diglycidyl ether; giglycidyl-N,N'-ethylene urea; diglycidyl-N,N'-propylene urea; di-, tri- and tetra-glycidyl-acetylene-diurea; and oligomers of these compounds. Other epoxides which may be used in the invention are known and are described, e.g., in Houben-Weyl, published by Eugen Müller, 1963, Volume XIV/2, pages 462–538.

The following are examples of suitable monooxetanes: trimethylene oxide, 3,3-dimethyl-oxetane, 3,3-diethyl-oxetane, 3,3-dipropyl-oxetane, 3,3-dibutyl-oxetane, 3-methyl-3-dodecyloxetane, 3-ethyl-3-stearyl-oxetane, 3,3-tetramethyleneoxetane, 3,3-pentamethyleneoxetane, 2,6-dioxaspiro(3,3)-heptane, 3-mwethyl-3-phenoxymethyl-oxetane, 3-ethyl-3-phenoxymethyl-oxetane, 3-methyl-3-chloromethyl-oxetane, 3-ethyl-3-chloromethyl-oxetane, 3-butyl-3-chloromethyl-oxetane, 3-dodecyl-3-chloromethyl-oxetane, 3-stearyl-3-chloromethyoxetane, 3-methyl-3-bromomethyl-oxetane, 3-ethyl-3-bromomethyl-oxetane, 3-propyl-3-bromomethyl-oxetane, 3-dodecyl-3-bromomethyl-oxetane, 3,3-bis-chloromethyl-oxetane, 3,3-bisbromomethyl-oxetane, 3-methyl-3-hydroxymethyl-oxetane, 3-ethyl-3-hydroxymethyl-oxetane, 3-amyl-3-hydroxymethyl-oxetane, 3,3-bis-hydroxymethyl-oxetane, and ethers, esters and urethanes of these hydroxy-oxetanes, e.g. 3-ethyl-3-methoxymethyl-oxetane, 3-ethyl-3-butoxymethyl-oxetane, 3-ethyl-3-dodecycloxymethyl-oxetane, 3-ethyl-3-acetoxymethyl-oxetane, 3-ethyl-3-stearoyloxymethyl-oxetane, 3-ethyl-3-N-methylcarbamoylmethyl-oxetane, 3-ethyl-3-N-chloroethyl-carbamoylmethyloxetane, 3-ethyl-3-N-phenylcarbamoylmethyl-oxetane, 3-ethyl-3-N-dichlorophenyl-carbamoylmethyl-oxetane, 3-ethyl-3-N-stearylcarbamoylmethyl-oxetane, 3,3-bis-phenoxymethyl-oxetane, 3,3-bis-(4-chlorophenoxymethyl)-oxetane, 3,3-bis-(2,4-dichlorophenoxymethyl)-oxetane, 3,3-bis-(carbamoylmethyl)-oxetane and 3-phenoxy-methyl-3-carbamoylmethyl-oxetane. Other suitable oxetanes are described, for example, in German Auslegeschrift No. 1,668,900, columns 3 and 4.

The oxetane analogues of the glycidyl derivatives mentioned above may also be used, e.g. 3-ethyl-3-acryloxyoxetane, 3-ethyl-3-methacryloxy-oxetane, 3-methyl-3-trichloroacetoxy-oxetane, 3-methyl-3-β-cyanoethoxymethyl-oxetane, 3-ethyl-β-cyanoethoxymethyl-oxetane and 3-ethyl-3-phenoxymethyl-oxetane.

Particularly important among the di- and poly-oxetanes which may be used in the invention are the reaction products of 3-alkyl-3-hydroxymethyl-oxetanes with di- and poly-carboxylic acids and with di- and poly-isocyanates. Also very suitable are the di- and poly-ethers of hydroxyoxetanes which are derived from aliphatic, cycloaliphatic and aromatic diols and polyols. Additional suitable compounds are bis-oxetanyl esters (German Auslegeschrift No. 1,907,117) and phosphoric acid esters and phosphorous acid esters, such as tris-(3-methyloxetanylmethyl)-phosphite, tris-(3-ethyl-oxetanylmethyl)phosphite and tris-(3-ethyl-oxetanylmethyl)-phosphate.

Hydrophobic, water-insoluble and liquid mono- and poly-epoxides are quite particularly preferred, e.g. polyglycidyl ethers of polyhydric phenols, in particular of bisphenol A; polyepoxide compounds based on aromatic amines, in particular bis-(N-epoxypropyl)-aniline, N,N'-dimethyl-N,N'-diepoxypropyl-4,4'-diaminodiphenylmethane and N-diepoxypropyl-4-aminophenylglycidyl ether; polyglycidyl esters of aromatic or cycloaliphatic dicarboxylic acids, in particular hexahydrophthalic acid diglycidyl esters and phthalic acid diglycidyl esters having more than 5.5 epoxide equivalents per kg; also phosphoric acid triglycidyl esters, 3-ethyl-3-hydroxymethyloxetane and its esters, ethers and urethanes, glycidyl, epichlorohydrin and trichlorobutene oxide. These products may be processed particularly easily by the methods of polyurethane technology and give rise to polyurethane-polysulfonic acid esters which are exceptionally resistant to water and moisture. The most preferred oxiranes and oxetanes resp. are: bis-glycidyl ether of bisphenol, A, glycidol, 3-methyl-3-hydroxymethyl-oxetane, 3-ethyl-3-hydroxymethyl-oxetane.

The reaction between isocyanatosulfonic acid and oxirane or oxetane generally requires no catalysts since the addition of the sulfonic acid group to the oxirane ring or oxetane ring will generally proceed at sufficient velocity even at room temperature, but it may be advantageous to accelerate the addition of resulting hydroxyl groups to the isocyanate group. The conventional catalysts used in polyurethane chemistry are suitable for this purpose, e.g. the following: tertiary amines, N-methyl-morpholine, N-ethylmorpholine, N-cocomorpholine, N,N,N',N'-tetramethyl-ethylenediamine, 1,4-diazabicyclo-(2,2,2)-octane, N-methyl-N'-dimethylaminoethyl-piperazine, N,N-dimethylbenzylamine, bis-(N,N-diethylaminoethyl)-adipate, N,N-diethylbenzylamine, pentamethyl-diethylenetriamine, N,N-dimethyl-cyclohexylamine, N,N,N',N'-tetramethyl-1,3-butanediamine, N,N-dimethyl-$\beta$-phenylethylamine, 1,2-dimethylimidazole and 2-methylimidazole.

Examples of tertiary amines having isocyanate-reactive hydrogen atoms include, triethanolamine, triisopropanolamine, N-methyl-diethanolamine, N-ethyl-diethanolamine, N,N-dimethyl-ethanolamine and the reaction products thereof with alkylene oxides, such as propylene oxide and/or ethylene oxide.

Silaamines having carbon-silicon bonds as described, e.g. in German Pat. No. 1,229,290, may also be used as catalysts, e.g. 2,2,4-trimethyl-2-silamorpholine or 1,3-diethylaminomethyl-tetramethyl-disiloxane.

Basic nitrogen compounds, such as tetraalkylammonium hydroxides; alkali metal hydroxides, such as sodium hydroxide; alkali metal phenolates, such as sodium phenolate; and alkali metal alcoholates, such as sodium methylate, may also be used as catalysts. Hexahydrotriazines, 2,4,6-tris(dimethylaminomethyl)-phenol, aluminum alcoholates and triphenyl phosphine are also suitable catalysts.

Organic compounds may also be used as catalysts, in particular organic tin compounds.

The organic tin compounds used are preferably tin (II) salts of carboxylic acids, such as tin (II) acetate, tin (II) octoate, tin (II) ethyl hexoate and tin (II) laurate; and dialkyl tin salts of carboxylic acids, such as dibutyl tin diacetate, dibutyl tin dilaurate, dibutyl tin maleate or dioctyl tin diacetate.

Further examples of catalysts which may be used in the invention and details concerning the activity of the catalysts are given in Kunststoff-Handbuch, Volume VII, published by Vieweg and Höchtlen, Carl-Hanser-Verlag, Munich 1966, pages 96 to 102.

The catalysts are generally used in a quantity of from about 0.001 to 10%, by weight, based on the quantity of component (a).

Tertiary amines which may only be alkylated to a slight extent and organic metal compounds are particularly preferred, but care should in any case be taken to ensure that the catalysts are not alkylated too soon by the sulfonic acid ester groups and thereby rendered inactive. On the other hand, such a "destruction" of the catalyst may be perfectly desirable at the end of the reaction and contribute to the stability of the reaction product. In addition to di- and poly-epoxides, there may also be used sub-equivalent quantities of the conventional epoxide hardeners. Examples are amines containing at least two hydrogen atoms directly attached to the nitrogen, including aliphatic and aromatic primary and secondary amines, such as mono- and di-butylamine, p-phenylene-diamine, bis-(p-aminophenyl)-methane, ethylene diamine, N,N-diethyl-ethylene diamine, diethylene triamine, tetra-(hydroxyethyl)-diethylene triamine, triethylene tetramine, tetraethylene pentamine, piperidine, guanidine and guanidine derivatives, such as phenylguanidine and diphenylguanidine. Additional examples are dicyandiamine, aniline/formaldehyde resins, polymers or aminostyrenes and polyaminoamides, for example those which are obtained from aliphatic polyamines and dimerized or trimerized unsaturated fatty acids; polyhydric phenols, for example resorcinol, hydroquinone, 2,2-bis-(4-hydroxyphenyl)-propane, phenyl/aldehyde resins and oil modified phenol/aldehyde resins, reaction products of aluminum alcoholates or aluminum phenolates with tautomerically reacting compounds, such as ethyl acetoacetate; Friedel-Crafts catalysts, for example $AlCl_3$, $SnCl_4$, $ZnCl_2$, $BF_3$ and the complexes thereof with organic compounds; phosphoric acids and polycarboxylic acids and the anhydrides thereof, for example phthalic acid anhydride, tetrahydrophthalic acid anhydride, dodecenylsuccinic acid anhydride, hexahydrophthalic acid anhydride, hexachoroendomethylene-tetrahydrophthalic acid anhydride or endomethylene-tetrahydrophthalic acid anhydride or mixtures thereof or maleic or succinic acid anhydrides.

Surface active additives (emulsifiers and foam stabilizers) may also be used. Suitable emulsifiers include, e.g. the sodium salts of ricinoleic sulfonates or of fatty acids or the salts of fatty acids with amines, such as oleic acid dimethylamine or stearic acid diethanolamine. Alkali metal or ammonium salts of sulfonic acids, such as dodecylbenzene sulfonic acid or dinaphthylmethane disulfonic acid; or of fatty acids, such as ricinoleic acid, or of polymeric fatty acids may also be used as surface active additives.

Particularly suitable foam stabilizers are the water-soluble polyethersiloxanes. These compounds generally have a polydimethylsiloxane group attached to a copolymer of ethylene oxide and propylene oxide. Foam stabilizers of this type have been described in U.S. Pat. No. 2,764,565. These additives are preferably used in a quantity of 0.20%, by weight, based on the reaction mixture.

The process is very simple to carry out on the basis of the starting materials mentioned above and does not differ in practice from the conventional procedures of polyurethane chemistry which are well known to those skilled in the art. From a practical point of view of procedure, the epoxide or oxetane is to be regarded as a polyol component since, in its capacity as monoepoxide, it reacts bifunctionally with an isocyanatosulfonic acid.

In the simplest case, the isocyanatosulfonic acid is mixed with the epoxide or oxetane, whereupon polyaddition takes place at room temperature and a polymer is formed. This method is particularly suitable when partially sulfonated liquid polyisocyanates or liquid isocyanate prepolymers are used. When producing foams, catalysts and blowing agents may also be added to the reaction mixture, and water may also be used to start the foaming reaction.

If solid, pulverulent isocyanatosulfonic acids are used, care must be taken to ensure that the reaction mixture becomes homogeneous during the reaction, i.e. that the isocyanatosulfonic acid dissolves. If it does not, the reaction must be carried out either in the presence of water or polar solvents or at elevated temperature. According to a preferred embodiment of the process, the isocyanatosulfonic acid is first reacted with a polyol, in particular one of the conventional polyether or polyester components used in polyurethane chemistry. This reaction is carried out with stirring and if necessary external supply of heat until a completely or almost completely homogeneous isocyanate prepolymer is obtained and only then is the epoxide or oxetane added.

According to another, also preferred, procedure, the solid poly-isocyanatosulfonic acid, which may be dispersed in any of the conventional polyisocyanates, is mixed with the mixture of polyhydroxyl compounds and epoxide or oxetane to form a dispersion. The sulfonic acid goes into solution as soon as the reaction has begun.

The proportions in which the reactants are used may vary within wide limits, but it must always be borne in mind that the reaction product finally obtained should be a high molecular weight polyurethane which is substantially free from isocyanate groups. In order to calculate the isocyanate group equivalents, the equivalents of all the Zerewitinoff-active co-reactants, including the OH groups which may be introduced into the reaction with the hydroxyoxiranes or hydroxyoxetanes, must be subtracted from the isocyanate group equivalents which are put into the process in the form of isocyanates. The relevant equivalent is therefore the equivalent of isocyanate groups theoretically present in the prepolymer which is formed from the sum of all the isocyanates and the sum of all the Zerewitinoff-active co-reactants (in most cases polyols), regardless of whether such a prepolymer is in fact completely or partially formed in the first reaction step and whether the reaction with the epoxide component is carried out in a one-shot process. The equivalent ratio of the isocyanate groups calculated in this way to the SO$_3$H groups should be from 0.1:1 to 1.99:1, but is preferably from 0.2:1 to 1:1. The lower end of this range may be used when isocyanatosulfonic acids and polyhydroxyl compounds are primarily used. The upper end of the range may be used when the process is carried out in the absence of additional polyols, or other Zerewitinoff-active compounds, or when a substantial proportion of the conventional non-sulfonated isocyanates, as well as an approximately equivalent quantity of polyols, are used. If the NCO/SO$_3$H ratio is greater than 1:1, the use of Zerewitinoff-active compounds in the formulation is necessary and the quantity required depends on the extent to which a ratio of 1:1 is exceeded. This means that a ratio of 1.8:1, for example, requires at least 0.8 equivalents of active hydrogen compound.

To calculate the epoxy group equivalents which are relevant to the present invention, the equivalents of any epoxide hardeners used must be subtracted in analogous manner. Primary and secondary amines generally react more rapidly with the isocyanate group than with the epoxy group and should therefore be regarded as epoxide hardeners only if they are added separately to the epoxide component from the start in order to modify it or if they are added to the reaction mixture at the end, after the isocyanate groups have reacted.

The equivalent ratio of epoxy groups to SO$_3$H groups should be from 0.2:1 to 5:1, preferably from 0.5:1 to 2:1. This means that, in the extreme case, only 20% of all the sulfonic acid groups present are esterified such as when it is desired to obtain an ionic product containing sulfonate groups and the reaction with the epoxide is intended to serve merely to render the product partially hydrophobic or to increase the degree of branching. On the other hand, the epoxide component may be used in excess, for example in order to ensure quantitative esterification and to introduce free epoxy groups into a polymer (e.g. in order to obtain optimum bond strength in the case of coating materials or in order to have free epoxides in the polymer as plasticizers or bonding agents). Furthermore, it may also be desirable to carry out a reaction of free epoxy groups with free isocyanate groups or a trimerization following the reaction according to the present invention as a step of heating hardening to effect endcross-linking. If the NCO/SO$_3$H ratio is higher than 1, one would preferably also use an epoxide/SO$_3$H ratio higher than 1. The reaction may be carried out in the presence or absence of solvents. If solvents do not interfere with the reaction, it is advantageous first to convert the isocyanate and polyol components into a relatively high molecular weight prepolymer, e.g. having an average molecular weight of from 5,000 to 20,000, which may be dissolved in one or more solvents. For producing a coating, the epoxide component, which may also be dissolved in a solvent, is then combined with the solution of the prepolymer, and the solution is applied and the solvent removed by evaporation. The reaction according to the present invention takes place on the substrate, either at the same time or subsequently. Suitable solvents are, for example, ketones, esters, halogenated hydrocarbons, optionally mixed with unhalogenated hydrocarbons, and dimethylformamide.

The reaction is preferably carried out without the conventional solvents or in the presence of only very small quantities of apolar solvents with which the isocyanatosulfonic acid is stabilized or in the presence of liquid plasticizers. The process is particularly suitable for the technologies of casting, reaction injection molding (RIM technology) and the production of foams.

Various embodiments of the process according to the present invention are particularly important for the production of foams or microcellular materials and molded parts. For example, partially sulfonated liquid polyisocyanates may be used, e.g. sulfonated phosgenation products of aniline/formaldehyde condensation. The polyisocyanate is then a homogeneous liquid and may be processed in the conventional manner.

Dispersions of solid sulfonated polyisocyanates in non-sulfonated liquid polyisocyanates, for example of the type obtained from the partial sulfonation of tolylene-diisocyanate, may also be used. Where such dispersions are resistant to sedimentation, e.g. after the disperse phase has been size reduced in a mill, they may be handled like liquid polyisocyanates. Dispersions which are not resistant to sedimentation may be brought into solution by reaction with an epoxide or oxetane, for example immediately before foaming, and may then be foamed with the polyhydroxyl component. Alternatively, the dispersion may be directly reacted with the polyol and epoxide or oxetane and the conventional additives by the one-shot foaming process.

If the polyisocyanate component used consists exclusively of polyisocyanatosulfonic acids, these may be added dry to the reaction mixture, for example like fillers. It is more advantageous, however, to make up the solid polyisocyanate into a paste with the liquid polyol component and then bring about the reaction with blowing agent and epoxide. The polyisocyanate may also be dissolved in the epoxide component with reaction and then mixed with the other components.

Compared with other, known reactions between polyisocyanates and polyepoxides, it should be mentioned that the reaction according to the present invention will commence anywhere from 0° to 30° C., preferably at room temperature. Heating of the reaction mixture causes vigorous acceleration of the reaction and is therefore necessary only if a very rapid reaction is required. It is possible, although by no means necessary, to employ temperatures above 80° C., up to about 190° C. The preferred temperature range is from 20° to 60°

C. The temperature generally rises during the reaction by from about 10° to 80° C.

Polar hydroxyl compounds, such as polyethers and polyesters which contain oxyethylene units are exceptionally suitable reactants for solid sulfonated polyisocyanates. Particularly suitable oxiranes and oxetanes are those which contain free hydroxyl groups in addition, such as glycidol and 3-alkyl-3-hydroxymethyl-oxetane. In one particularly preferred embodiment of the process, a monosulfonated diisocyanate, such as sulfonated tolylene diisocyanate or sulfonated diisocyanato-diphenyl methane, is reacted with approximately the equivalent quantity of glycidol or 3-ethyl-3-hydroxymethyl-oxetane, and for any additional polyhydroxyl compounds used, an equivalent quantity of the conventional polyisocyanates is added.

Due to the good adherence of the polymers of the present invention to surfaces of various types, particularly to polar surfaces, it is frequently advantageous to add inorganic fillers. Preferred fillers include: chalk, talcum, dolomite, gypsum, clay, anhydrite, powdered quartz, aluminum hydroxide, calcium-aluminum silicates, cement and glass in the form of fibers, powder or pellets. Other inorganic and organic fillers such as those described in German Offenlegungsschrift No. 2,359,609 may also be used.

The conventional blowing agents, such as hydrocarbons and halogenated hydrocarbons, are used for producing foams, but carbon dioxide (obtained, e.g. by adding water to the formulation) or dissolved gases, e.g. compresed air, may also be used for foaming.

The products of the process are used in the conventional fields of application for compact and cellular elastomers, flexible foams, semi-rigid foams and rigid foams, particularly where high demands are made on the cross-linking density, fire characteristics and capacity for degradation. The products obtained by the process of the present invention are suitable for the manufacture of cushioning and padding materials, mattresses, elastic underlays, motor car seats, damping materials, shock absorbers, constructional materials, sound damping insulations, moisture absorbing materials, e.g. in the surgical field, and as substrates for the cultivation of plants and for protection against heat and cold.

EXAMPLES

Preparation of prepolymers having isocyanate and groups (I): 700 g (0.35 mol) of a polypropylene ether glycol of OH number 56 which was started on propylene glycol-(1,2) are intimately mixed at room temperature with 150 g (0.455 mol) of the toluene-moist uretdione of diisocyanatotoluene-sulfonic acid (as disclosed in German Offenlegungschrift No. 2 640 103, example 1; prepared from tolylene diisocyanate, isomeric mixture 2,4:2,6=80:20), corresponding to 115.5 g of dry substance.

The suspension is stirred for 12 hours, during which time the temperature rises from 25° C. to 41° C. and most of the isocyanate reacts and goes into solution. A clear, viscous isocyanate prepolymer is obtained after 4 hours stirring at from 70° to 76° C. After the addition of 85 g of trischloroethyl phosphate, the viscosity at room temperature is 65,000 cP. 89 g of the product contain 0.02 gram-equivalents of NCO and 0.043 gram-equivalents of SO$_3$H.

(II): The procedure is the same as under (I), but using 500 g of the polyether described there, 165 g (corresponding to 127 g of dry substance) of the uretdione of diisocyanatotoluene sulfonic acid (molar ratio 1:2) and 66.5 g of trischloroethyl phosphate. Viscosity at room temperature: 40,000 cP. 58 g of the product contain 0.04 gram-equivalents of NCO and 0.04 gram-equivalents of SO$_3$H. (III): 132 g (0.05 mol) of a polyester (OH number 33, molecular weight 2640) of adipic acid and diethylene glycol, which polyester has OH end groups, are mixed at 60° C. with 100 g (0.3 mol) of the toluene-moist uretdione of diisocyanatotoluene sulfonic acid, corresponding to 76 g of dry substance. The mixture is gradually heated to 95° C. over a period of 12 hours with stirring. A thick, viscous ester-modified diisocyanate is obtained.

EXAMPLE 1

89 g of (I) and 6.8 g of the bis-glycidyl ether of bisphenol A are very rapidly and intimately mixed at 30° C. in a siliconized metal dish. The viscosity rises steeply during this mixing. A clear, cross-linked elastomer is obtained after 5 minutes. This elastomer initially still has a certain plasticity, but after 2 hours the surface is dry and the product may no longer be indented by pressure.

EXAMPLE 2

89 g of (I) are mixed with 2.9 g of 1,2-butylene oxide. 0.5 g of triethylamine are added to the viscous mass after 24 hours. The product obtained has a consistency suitable for application with a trowel and may be used, for example, as grouting composition or sealing compound. A very slightly cross-linked product which is elastic, but still plastic enough to be indented by pressure is obtained in the course of a few weeks.

EXAMPLE 3

89 g of (I) are mixed with 4.7 g of 3-ethyl-3-hydroxymethyl-oxetane. The viscosity rises steeply within 24 hours, but the mass remains plastic. Reheating at from 50° to 100° C. results in a very soft, sticky elastomer which is capable of plastic deformation.

EXAMPLE 4

89 g of (I) and 40.8 g of a 50% solution of the bis-glycidyl ether of bisphenol A in trischloroethyl phosphate are mixed at room temperature. In contrast to the sample of Example 1, the mixture is still fluid after 15 minutes. A cross-linked elastomer is obtained 1 hour later.

EXAMPLE 5

The procedure is the same as in Example 4, but using 27.2 g of the 50% epoxide solution. The elastomer is substantially harder and more highly cross-linked than the product obtained according to Example 4.

EXAMPLE 6

58 g of (II) are mixed with 6.8 g of the bis-glycidyl ether of bisphenol A at room temperature. The mixture is still fluid after 10 minutes. After 30 minutes, an elastomer is obtained which initially still has a certain plasticity. After 6 hours, the product is no longer deformable.

A sample of the elastomer is kept under water for 3 months. A small portion of it dissolves in water, but the elastomer remains virtually unchanged. Swelling is slight and no degradation is observed.

EXAMPLE 7

Example 3 is repeated, but using 58 g of (II) instead of (I). A very soft, barely tacky cross-linked elastomer is obtained.

EXAMPLE 8

The procedure is the same as in Example 4, but using 58 g of (II) instead of (I). The mixture is still fluid after 1 hour. A very soft, clear elastomer is obtained after 24 hours.

EXAMPLE 9

30 g of (III) are stirred with a mixture of 3 g of the bis-glycidyl ether of bisphenol A and 2 g of epichlorohydrin at 90° C. A rigid, cross-linked elastomer is obtained within 1 minute.

EXAMPLE 10

30 g of (III) are stirred with 3.6 g of epichlorohydrin at 80° C. A plastic mass which may be used as putty and sealing compound is obtained within 48 hours.

EXAMPLE 11

Component (A): 100 g (0.05 mol) of a linear polyether having a molecular weight of 2,000 which has been started on propylene glycol and contains 80% of propylene oxide and, in end positions, 20% of ethylene oxide, are mixed with 11.6 g (0.1 mol) of 3-hydroxymethyl-3-ethyl-ocetane, and 2 g of a mixture of 1 p.b.w. of "Dabco" and 2 p.b.w. of dipropylene glycol are added as catalyst.

Component (B): 25.4 g (0.1 mol) of the uretdione of diisocyanatotoluene sulfonic acid (prepared from tolylene diisocyanate, isomeric mixture 2,4:2,6=80:20), 8.7 g (0.05 mol) of tolylene diisocyanate and 4 g of toluene are mixed together to form a paste. Component (A) heated to 60° C. is intimately mixed with component (B). The isocyanatosulfonic acid progressively dissolves in the liquid mixture. The mixture is no longer fluid after 15 minutes. A slightly cloudy, completely tack-free elastomer is obtained after several hours at room temperature.

Hardening may be greatly accelerated by reheating the mixture at 100° C.

In order to obtain a completely transparent elastomer, it is advantageous to mill the isocyanatosulfonic acid down to a particle size of at the most 100μ before the reaction and to add a small quantity (from 3 to 10 g) of triethyl phosphate to component (B).

The use of a polyether having a higher ethylene oxide content also accelerates the reaction.

EXAMPLE 12

The procedure is the same as in Example 11, but using 7.2 g (0.1 mol) of glycidol instead of the oxetane. The elastomer obtained is similar to that obtained according to Example 11.

EXAMPLE 13

Component (A): The same as Example 11, but using 0.2 g of tin dioctoate as catalyst instead of "Dabco" 33 LV.

Component (B): The same as Example 11.

The two components are intimately mixed at room temperature. The temperature rises to 38° C. The mixture no longer flows after 60 minutes. The elastomer obtained is slightly softer than that obtained according to Example 11 and it is slightly tacky.

EXAMPLE 14

Component (B) of Example 11 is first intimately mixed with the polyether described under component (B) of Example 11, a white paste being formed with slight heating. This paste is then mixed with 11.6 g of 3-hydroxymethyl-3-ethyl-oxetane and 2 g of dimethylbenzylamine. The heat treatment is completed by heating the mixture at 160° C. for 30 minutes. A transparent, tack-free elastomer is obtained.

EXAMPLE 15

Component (A): 184.5 g (0.3 mol) of a linear polyethylene glycol polyether having a molecular weight of 615 are mixed with 29 g (0.25 mol) of 3-hydroxymethyl-3-ethyl-oxetane.

Component (B): 63.5 g (0.25 mol) of the uretdione of diisocyanatosulfonic acid, 52.2 g (0.3 mol) of tolylenediisocyanate and 20 g of toluene are mixed to form a suspension.

Component (A) is heated to 40° C. and mixed with component (B). The temperature rapidly rises to 85° C. and a clear mixture is obtained. 8 minutes after the components are combined, polyaddition has progressed to such an extent that the mixture has become highly viscous. A cross-linked polyurethane is obtained after 15 minutes. The resulting material is hard, tough and of a clear transparency.

When the product is kept in water, it undergoes reversible softening, but only slight swelling and no hydrolytic degradation.

EXAMPLE 16

Component (A): As in Example 15.

Component (B): As in Example 15, but using only 34.8 g (0.02 mol) of tolylene diisocyanate.

Component (A) is heated to 60° C. and rapidly mixed with component (B). The temperature rapidly rises to 100° C. and the isocyanatosulfonic acid goes into solution. 3 minutes after mixing of the components, the mixture becomes solid. The material obtained is softer and slightly more elastic than that obtained according to Example 15.

EXAMPLE 17

Component (A): 60.2 g (0.1 mol) of a linear polyether of molecular weight 602 composed of 50% of propylene oxide and 50% of ethylene oxide (initiator propylene glycol-1,2) are mixed with 23.2 g (0.2 mol of 3-hydroxymethyl-3-ethyl-oxetane.

Component (B): 50.8 g (0.2 mol) of the uretdione of diisocyanatosulfonic acid, 17.4 g (0.1 mol) of toluene diisocyanate and 18 g of toluene are mixed to form a paste.

The two components are mixed at 50° C. The mass begins to solidify after 2 minutes. A very hard, but not brittle material is obtained which is colorless and only slightly cloudy.

EXAMPLE 18

Component (A): 277 g (0.45 mol) of a linear polyethylene glycol polyether having a molecular weight of 615,
29 g (0.25 mol) of 3-hydroxymethyl-3-ethyl-oxetane,
10 g of monopropoxy-trimethylol propane,
5 g of tin dioctoate, 1 g of a polyphenyl siloxane stabilizer according to German Offenlegungsschrift No. 2,232,525, and 2 g water.

Component (B): 63.5 g (0.25 mol) of the uretdione of diisocyanatotoluene sulfonic acid, 85.5 g (0.49 mol) of tolylene diisocyanate and 20 g of toluene.

Component (A) is heated to 50° C. and rapidly mixed with component (B). The reaction mixture foams while the temperature rapidly rises to 117° C. An elastic, finely porous foam is obtained.

What is claimed is:

1. Polyurethanes having a molecular weight above 12,000 and containing arylsulfonic acid alkyl ester groups produced by reacting at from 0° to 190° C.
   (a) aromatic polyisocyanatosulfonic acids with
   (b) oxiranes or oxetanes wherein the equivalent ratio of isocyanate groups (including dimerized isocyanate) to sulfonic acid groups is from 0.1:1 to 1:1 and the equivalent ratio of epoxide, oxetane and mixtures thereof groups to sulfonic acid groups is from 0.2:1 to 5:1.

2. The polyurethanes of claim 1, comprising polyether, polyester units or mixtures thereof.

3. The polyurethanes of claim 1, comprising arylsulfonic acid alkyl ester groups of the formula:

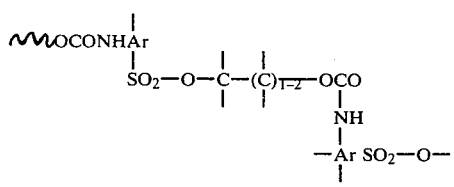

wherein Ar represents a residue of an aromatic isocyanate.

4. The polyurethanes of claim 3, wherein said arylsulfonic acid alkyl ester groups are of the formula:

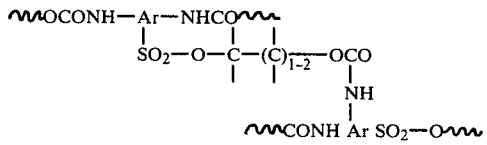

wherein Ar represents a residue of an aromatic isocyanate.

5. A process for the preparation of polyurethanes having a number average molecular weight above 12,000 and containing arylsulfonic acid alkyl ester groups, comprising: reacting at from 0° to 190° C.
   (a) aromatic isocyanatosulfonic acids; with
   (b) oxiranes, oxetanes and mixtures thereof wherein the equivalent ratio of NCO groups to SO$_3$H groups is from 0.2:1 to 1:1 and the equivalent ratio of epoxide, ocetane and mixtures thereof groups to SO$_3$H groups is from 0.2:1 to 5:1.

6. The process of claim 5, wherein said equivalent ratio of NCO groups to SO$_3$H groups is from 0.2:1 to 1:1 and said equivalent ratio of epoxide groups to SO$_3$H groups is from 0.5:1 to 2:1.

7. The process of claim 5, wherein said aromatic isocyanatosulfonic acids contain polyether, polyester units or mixtures thereof.

8. The process of claim 5, wherein components (A) and (B) are reacted in the presence of: (C) ether polyols, polyester polyols and mixtures thereof.

9. The process of claim 5, wherein component (A) is selected from the group consisting of the dimeric forms of mono- and di-sulfonic acids of 4,4'-diisocyanato-diphenylmethane, 2,4-diisocyanato-diphenylmethane, 2,4-diisocyantoltoluene, 2,6-diisocyanatotoluene and mixtures thereof.

10. The process of claim 5, wherein component (B) is a polyglycidyl ether.

11. The process of claim 10, wherein said polyglycidyl ether is of the formula:

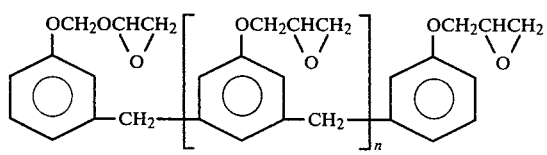

wherein n is an integer of from 0 to 1,000.

12. The process of claim 5, wherein component (B) is a triglycidyl isocyanurate of the formula:

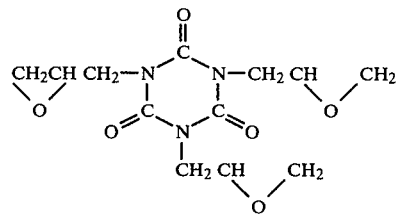

13. The process of claim 5, wherein component (B) is N,N'-diglycidyl-dimethylhydantoin.

14. The process of claim 5, wherein component (B) is a polyglycidyl ether of bis-(-p-hydroxyphenyl)-dimethyl methane (bis-phenol A).

15. A procss for the preparation of polyurethanes having a number average molecular weight above 12,000 and containing aryl sulfonic acid alkyl ester groups, comprising: reacting at from 0° to 190° C.
   (a) aromatic isocyanatosulfonic acids; with
   (b) oxiranes, oxetanes and mixtures thereof wherein the equivalent ratio of NCO groups to SO$_3$H groups is from 0.1:1 to 1.99:1 and the equivalent ratio of epoxide, oxetane and mixtures thereof groups to SO$_3$H groups is from 0.2:1 to 5:1 provided that when there is an NCO excess, Zerewitinoff-active compounds are also used in an amount which corresponds to said excess.

16. Polyurethanes having a molecular weight above 12,000 and containing arylsulfonic acid alkyl ester groups produced by reacting at from 0° to 190° C.
   (a) aromatic polyisocyanatosulfonic acids with
   (b) oxiranes or oxetanes wherein the equivalent ratio of isocyanate groups (including dimerized isocyanate) to sulfonic acid groups is from 0.1:1 to 1.99:1 and the equivalent ratio of epoxide, oxetane and mixtures thereof groups to sulfonic acid groups is from 0.2:1 to 5:1, provided that when there is an NCO excess, Zerewitinoff-active compounds are also used in an amount which corresponds to said excess.

* * * * *